Nov. 18, 1952     C. M. PARRISH     2,618,456
AUTOMATIC WEIGHING AND DISPENSING MACHINE
Filed Nov. 1, 1948     2 SHEETS—SHEET 1
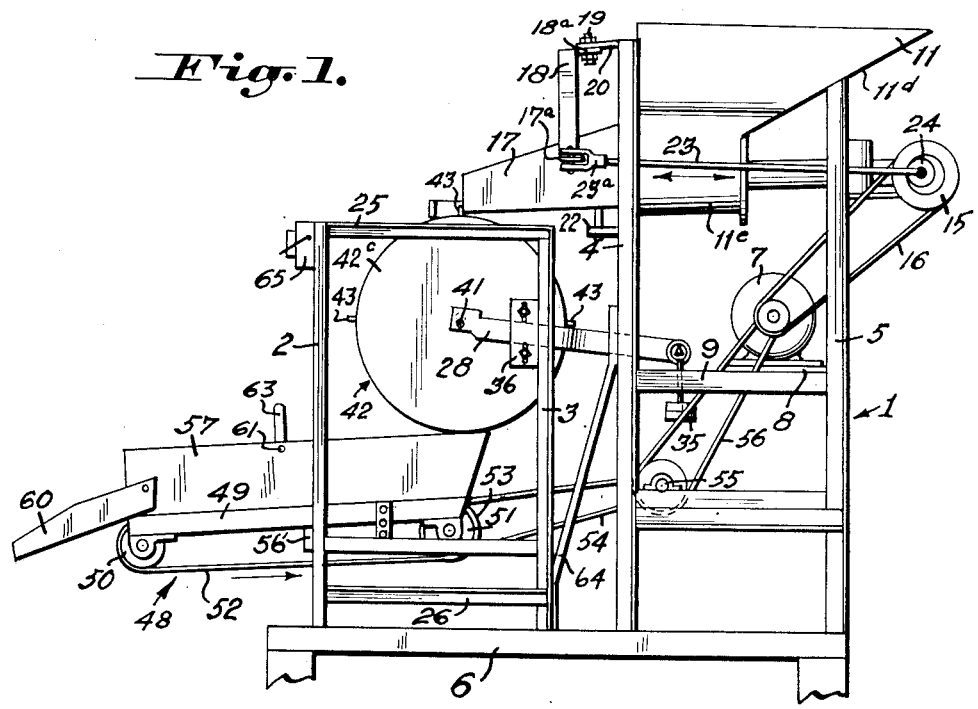
Fig. 1.
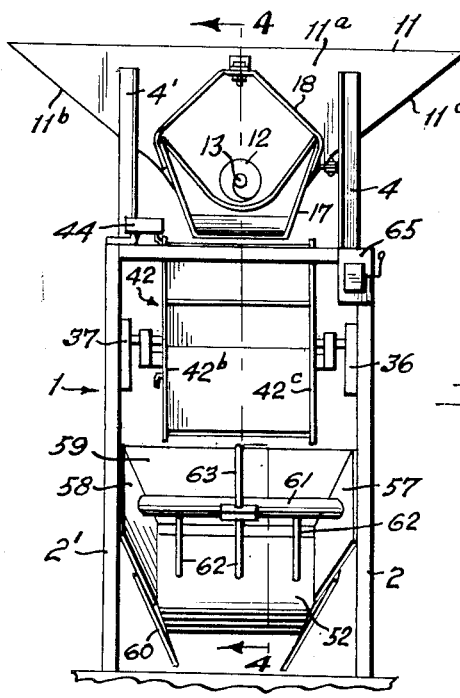
Fig. 2.
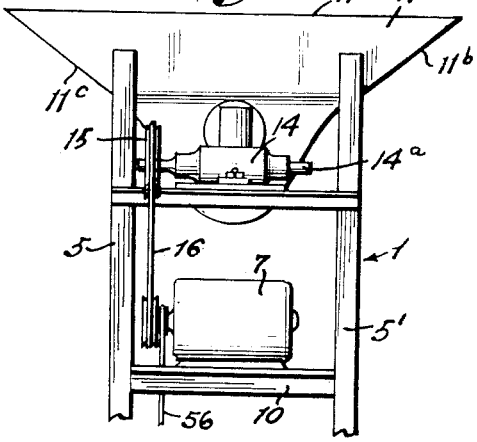
Fig. 3.
Fig. 11.
Inventor
Curtis M. Parrish
By Elizabeth Newton Dew
Attorney

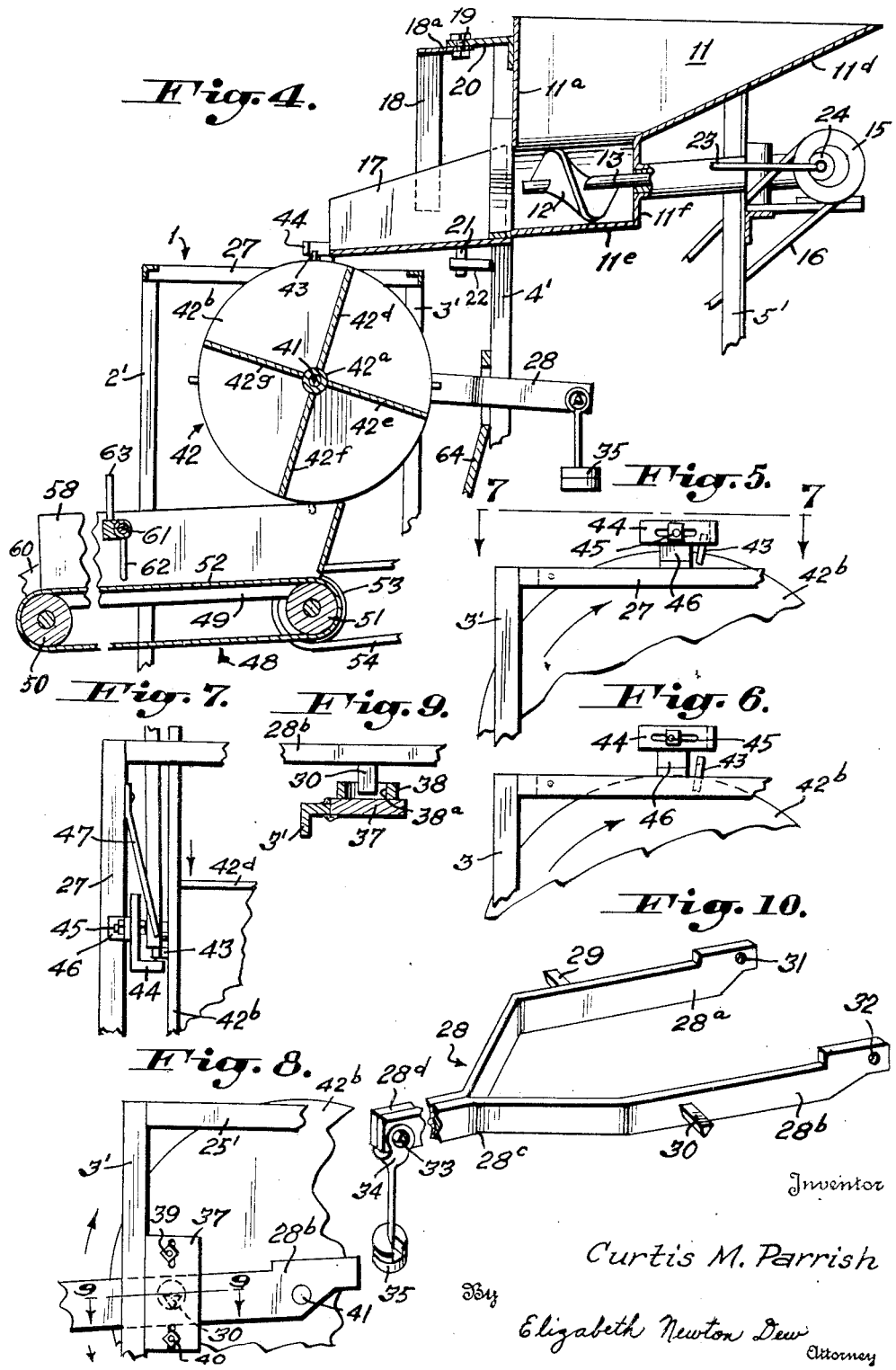

Patented Nov. 18, 1952

2,618,456

UNITED STATES PATENT OFFICE 2,618,456

AUTOMATIC WEIGHING AND DISPENSING MACHINE

Curtis M. Parrish, Richmond, Va.

Application November 1, 1948, Serial No. 57,788

2 Claims. (Cl. 249—19)

This invention relates to automatic weighing and dispensing machines and, more particularly, to machines for automatically weighing and dispensing in succession, pre-determined lots of lump, granular or pulverous materials such as coal, grain and cement.

It is an object of the invention to provide a mechanism of the type mentioned wherein each lot of weighed material is automatically separated from a mass of such material and dispensed for separate and convenient packaging.

A further object is the provision of an automatic weigher wherein each lot is discharged from a receptacle in response to the accumulation therein of a predetermined weight of material.

A still further object is to provide an automatic weigher comprising a rotatable drum having a plurality of weighing pockets the uppermost of which is held in offset relation to its pivot axis so that, when the rotor is released in response to accumulation of a predetermined quantity of material therein, it is rotated by gravity to discharge the aforesaid accumulated material.

A still further object is to provide a machine of the character aforesaid wherein the flow of material to the weighing rotor is rapid, smooth and uniform whereby exceptionally accurately weighing is obtained.

Another object is the provision of an automatic weigher which will save large amounts of time and labor otherwise consumed in packaging bulk material, which is relatively simple and inexpensive to build and operate and which is positive in operation.

Other objects will become apparent after a study of the following description in connection with the accompanying drawings wherein Figure 1 is a side elevational view showing the frame, hopper, vibrating chute, weighing rotor and conveyor.

Figure 2 is a front elevation of the machine.

Figure 3 is a rear elevation of the upper part only of the machine showing the drive from motor to feed worm.

Figure 4 is a sectional elevation taken upon a plane indicated by the line 4—4, Figure 2.

Figure 5 is a detail view of the weighing rotor in upper position and latched against rotation.

Figure 6 is a detail view similar to Figure 5 but showing the rotor in downward position and unlatched for rotation to deposit an accumulated weight of material upon the conveyor.

Figure 7 is a detail plan view as indicated by the line 7—7 of Figure 5, and showing the brake and stop member preventing retrograde rotation of the rotor.

Figure 8 is a detail elevational view showing the knife-edge pivot bearing for the weighing beam or yoke.

Figure 9 is a sectional detail view of the aforesaid bearing and taken upon a plane indicated by the line 9—9 of Figure 8.

Figure 10 is a perspective view of the weighing beam or yoke in which the weighing rotor is journaled, and Figure 11 is a detail view of one of the latching lugs or stops fixed to the rotor.

Referring in detail to the drawing 1 identifies generally a frame which may be built up from lengths of angle iron bolted, riveted or welded together. This frame as shown comprises four uprights 2, 3, 4 and 5, Figure 1, at the right side of the machine. Each upright has its counterpart 2', 3', 4' and 5', at the left side of the machine, as shown upon Figure 4. These uprights may rest upon sills or logitudinals such as 6, Figure 1, and are interconnected and braced by horizontal members as subsequently described.

Power for operating the machine is supplied by a motor 7 which may be bolted to a plate or base 8 resting upon and secured to horizontal brace members such as 9, Figure 1, extending between verticals 4 and 5, and brace member 10, Figure 3, extending between verticals 5 and 5'.

A hopper 11 is supported at the tops of verticals 4, 4', 5 and 5' and comprises a vertical front wall 11a, secured to verticals 4 and 4', as shown in Figure 2, sloping sides 11b and 11c, and a sloping rear wall 11d resting upon and attached to the upper ends of rear verticals 5 and 5', as indicated upon Figure 4. The lower edges of the hopper walls join and are rigidly united with upper edges of a generally semi-cylindrical trough 11e, closed at its rear end by wall 11f and having an open front end. A feed screw 12 is fixed to a shaft 13 journaled in wall 11f at one end and in a bracket, not shown, at its other end. Shaft 13 is rotated at reduced speed from a speed reducer 14 of conventional construction, and having an input shaft 14a. Shaft 14a carries a pulley 15 driven by a conventional V-belt 16 passing about a pulley on the shaft of motor 7. As shown, the worm 12 has a single flight or turn only and is geared down to rotate at about 60 R. P. M.

The worm feed described in the preceding paragraph acts to feed material from hopper 11 to a vibrating chute 17. This chute is carried for vibration or oscillation about a vertical axis defined by top and bottom aligned pivots. As clearly shown by Figures 1, 2 and 4, chute 17 has an inverted V-shaped strap 18 having a rearwardly offset portion 18a, pivoted by bolt 19 to a bracket 20 secured to the front wall of hopper 11. The lower pivot 21 is attached to the under side of the bottom of chute 17 and is supported by a bracket 22 extending forwardly from a crosspiece, not shown, supported by verticals 4 and 4'. As stated the two pivots are vertically aligned whereby the chute may have limited oscillation. The rear edges of the walls of the chute extend a slight distance rearwardly of the forward edges of trough 11e, as indicated upon Figure 4, so that all material fed from the trough by screw 12 passes to the chute.

Trough 17 is oscillated or vibrated by a pitman 23 pivoted at its forward end to trough 17 by a clevis 23a, Figure 1. The pitman has a bearing at its rear end journaled upon an eccentric pin 24 which may be fixed to pulley 15 or a part carried thereby. The throw of the crank is about 1/8" and the pulley ratios are such that the pitman will be vibrated from four to six times per second. As will be noted from Figures 1 and 2, the clevis 23a is connected by a pivot pin with a bracket 17a attached to the side wall of chute 17. Since the point of attachment is horizontally offset from the pivot axis of the chute, as defined by pivots 19 and 21, the chute is vibrated in response to operation of motor 7. It will be noted that the bottom of chute 17 has a moderate downward and forward slope so that material deposited thereon from hopper 11, is spread out by the vibration and travels downwardly over the bottom of the chute in a smooth even and uniform manner.

The verticals 2 and 3 are connected at top and bottom by horizontals 25 and 26, respectively. Corresponding horizontals such as 27, Figure 4, connect the verticals 2' and 3'. A weighing beam 28 shown in perspective in Figure 10, consists of a pair of spaced parallel arms 28a and 28b which converge at 28c and are there rigidly united to form a rearward portion 28d a portion of which is broken away in Figure 10. Knife-edge aligned-fulcrum bearings 29 and 30 extend outwardly from the respective arms. The forward ends of the arms are provided with aligned bearing apertures 31 and 32. The rearward portion 28d has knife edge bearings such as 33, which support a yoke or clevis 34 having an integral shaft on which counterweights 35 may be placed in the manner common with weighing scales.

Supporting plates 36 and 37 are welded or otherwise rigidly attached to the inside upper portion of verticals 3 and 3', respectively, as shown at Figure 1 for plate 36, and at Figures 8 and 9 for plate 37. Each plate has a pair of spaced vertical aligned slots. A bearing element 38 has a hole 38a to receive the knife edge bearing 30 of beam 28. Bolts 39 and 40 pass through holes in element 38 and the aforesaid slots in plate 37 to rigidly clamp element 38 in position. By loosening the bolts, the bearing element can be given a small vertical calibration adjustment. Since the bearing element for knife-edge 29 and its mounting are duplicates of those just described, it is unnecessary to describe these elements in detail.

A shaft 41, Figure 8, has its ends fitting and fixed within holes 31 and 32 of the weighing beam. The rotor 42 comprises a built up body having a central tube section 42a having a smooth fit on shaft 41. A pair of spaced circular end plates 42b and 42c, are rigidly attached to tube 42a and radial plates 42d through g are connected rigidly to the circular end plates and the tube 42a. The radial plates extend to the periphery of the circular end plates 42b and 42c and are angularly spaced to form four equal pockets or material-receiving compartments.

One end plate, which may be 42b, has four equally spaced lugs 43 secured to its outer periphery, and, as shown at Figure 11, the end of each lug projects a slight distance beyond the periphery of the end plate. These lugs are positioned to cooperate, in succession, with stop means, subsequently described, to stop the empty rotor so that the respective compartments will be unsymmetrical with respect to a vertical plane through the rotor axis. That is, as shown upon Figure 4, the uppermost compartment about to receive material has its centroid or center of volume forwardly of the aforesaid vertical plane so that, when material has accumulated therein, the rotor is unbalanced and tends to rotate counterclockwise as seen in Figure 1.

The stop means previously mentioned may comprise a horizontal L-shaped member 44, Figure 7, having a longitudinal slot in its longer arm. A bolt 45 passes through the slot and the upwardly extending arm of a bracket 46 rigidly attached to horizontal 27. The shorter arm of stop member 44 extends horizontally laterally into the path of the lugs 43 when the rotor and weighing arm are in uppermost position about the axis defined by bearings 29 and 30. However, the relation of lugs 43 and stop member 44 is such that when the rotor and arm tilt downwardly in response to accumulation of a weight of material in the uppermost compartment, the corresponding lug is freed from member 44 and the rotor is thus freed for rotation. The weight of material to effect this function is, of course, determined by the number and value of the counterweights 35 in place.

From Figure 4 it will be noted that the rearward wall of the compartment in which material is being deposited from chute 17 is positioned just to the rear of the lower end of the chute. Consequently, the flow of material thereto is cut off almost immediately after the rotor is released and begins to turn. Furthermore, the accumulated material begins to pour out of the compartment as soon as the forward wall (shown as 42g upon Figure 4) passes below the horizontal position. Consequently, by the time the next lug 43 approaches stop 44, the previously accumulated lot of material has been completely discharged and the rotor and weighing arm have again tilted upwardly so that the next lug is engaged by stop 44 and material begins to accumulate in the corresponding pocket. In order to brake the rotor as it approaches a new position, I have provided a resilient arm 47 attached at one end to horizontal 27 and having its other end extending horizontally and laterally into the path of the lugs 43. Then, as the rotor approaches a new position, the lug frictionally engages arm 47 and is braked thereby. Just before the rotor reaches its new position, the lug passes off the end of the arm which then snaps behind the lug, thus locking the rotor against retrograde rotation.

A conveyor 48 is mounted below rotor 42 in position to receive the coal or other material as it is dumped from the rotor. This conveyor may consist of a frame 49 in which spaced parallel rollers 50 and 51 are journaled. A belt 52 passes over and about these rollers and is driven by a pulley 53, Figure 4, and belt 54, driven from a speed reducing countershaft 55 in a manner clear from inspection of Figure 1. The countershaft is driven by a belt 56 passing over a small pulley on the shaft of motor 7.

The side pieces comprising the frame 49 may be secured in any suitable way to cross pieces one of which, 56', is shown upon Figure 1. Side walls 57 and 58 have their lower edges closely adjacent and within the boundaries of the upper pass of conveyor belt 52, and act to confine the material to the belt. From the belt, the material passes to a chute and is caught by the operator in bags or other containers.

A material smoothing assembly is provided comprising a shaft 61 pivoted between the side walls 57 and 58 by pintles, as shown upon Figures 2 and 4. Metallic tines 62, shown as three in number, project radially from shaft 61. The ends of the tines terminate closely adjacent belt 52 and since the assembly is pendulous the tines ride over the material as it comes down the conveyor and act to smooth it out and provide a uniform even discharge to chute 60. A handle 63 extends upwardly from shaft 61 and may be grasped to aid in smoothing the flow or to raise the tines out of contact with the material.

The rear portion 28d of beam 28, passes through an aperture in a plate 64 having its lower end attached to a cross piece, not shown, extending between verticals 3 and 3'. By this construction, the downward tilting movement of the rotor and beam is limited to that sufficient to release the rotor from the stop member 44. By making member 44 adjustable, as described, the rotor may be released for rotation after only a slight downward tilt. Motor 7 is conveniently controlled by a switch box 65 mounted on the upper end of vertical 2, as shown in Figures 1 and 2.

The operation of the machine will be described as it is used for packaging coal. With motor 7 in operation coal from hopper 11 is fed by screw 12 to chute 17. The chute which is vibrating rapidly, smooths the coal as it is deposited therein so that the flow therefrom is smooth and uniform. Assuming that weights 35 are in place to determine 12-pound lots, coal will accumulate in the uppermost compartment of rotor 42. At the instant that twelve pounds have been accumulated therein, beam 28 tilts on its bearings 29 and 30 and lug 43, at that time in engagement with stop 44 moves downwardly to clear the stop. As the rotor is now in unbalanced condition it immediately begins a counterclockwise rotation as viewed upon Figures 1 and 4. Since the rear wall of the compartment in which the material has accumulated is just to the rear of the mouth of chute 17, cut-off of the flow of material to that pocket or compartment is quickly effected. Because of this fact, coupled with the smooth uniform flow from chute 17, the successive lots are weighed with great accuracy. Coal immediately begins to accumulate in the next succeeding pocket.

As the forward wall of the material-containing pocket (42g upon Figure 4) moves below the horizontal position, the weighed quantity therein is discharged onto conveyor belt 52 and after a brief interval, passes off the conveyor in a substantially uniform stream where it may be collected in a bag, box or other container by the operator. Thus two operators with the model illustrated have been able to prepare about five hundred 12-pound bags of coal per hour whereas the same two operators, working by hand would be able to prepare about 150 bags of like weight. In actual use, hopper 11 may be made of any desired capacity, within practical limits. Or hopper 11 may be fed or filled periodically from a much larger hopper of bin over it. This "bin," of course, may be a hopper-type railway car. In the model shown the weighing rotor is 20" in diameter and the pockets are 10" wide.

I have thus provided an automatic weighing and dispensing machine which is capable of rapid and accurate weighing of successive and distinct lots of material and delivering them for easy collection in bags or other receptacles. The machine is versatile and readily adapted to the weighing and dispensing of a wide variety of bulk materials or liquids.

While I have shown a preferred form of the invention, various modifications, alterations and substitutions will occur to those skilled in the art after a study of the present disclosure. Hence the foregoing disclosure should be taken in an illustrative rather than a limiting sense; and it is my intention and desire to reserve all modifications within the scope of the subjoined claims.

Having now fully disclosed the invention what I claim and desire to secure by Letters Patent is:

1. In an automatic weighing machine, a frame, a weighing beam pivoted between its ends in said frame, said beam having spaced parallel arms at one end, a rotor journaled on and between said arms and including spaced circular end plates connected by axially and radially extending partitions forming a plurality of material-receiving compartments, a feeding trough pivoted in said frame for vibration about an axis transverse thereto, said trough having its discharge end positioned to discharge material by gravity onto said rotor, a hopper on said frame above said chute and positioned to discharge material onto the receiving end of said chute, material feeding means operable to feed material from said hopper into said trough, a plurality of lugs secured to and projecting from the periphery of one of the plates of said rotor, a latch mounted on said frame and horizontally adjustable thereon in a direction parallel with the end plates of said rotor, said latch having a portion extending into the path of said lugs to engage the same in succession and locate a corresponding compartment in position to receive material from said chute, each lug being released from said latch in response to pivotal movement of said weighing beam as a predetermined weight of material is deposited in the uppermost compartment from said chute, a resilient friction element fixed at one end on said frame with its free end adjacent said latch, said element yieldingly engaging each lug in succession to brake said rotor as the latter moves into a material-receiving position with a lug in contact with said latch, a motor mounted on said frame, and means driven by said motor to simultaneously vibrate said trough and drive said material feeding means whereby material is fed to said rotor in a continuous uniform stream.

2. In an automatic weigher for bulk products, a frame, a weighing beam pivoted in said frame, a rotor journaled on one end of said beam and consisting of spaced circular end plates connected by radially and axially extending partitions forming peripherally-opening material-receiving compartments, a plurality of equally circumferentially spaced lugs extending from the periphery of one plate of said rotor, a stop member horizontally adjustable on said frame and having a portion projecting into the path of said lugs to stop said rotor with each compartment in upwardly-facing, material-receiving position, by engagement with a respective lug, and a resilient elongated spring element fixed at one end to said frame and extending with its longitudinal dimension along the path of travel of said lugs and having its other end adjacent but circumferentially spaced from said stop member, said element engaging and then yieldingly snapping into position behind each lug as a corresponding compartment moves into material-receiving position to first brake said rotor and then lock the same against retrograde rotation.

CURTIS M. PARRISH.

REFERENCES CITED

The following references are of record in the file of this patent:

UNITED STATES PATENTS

| Number | Name | Date |
|---|---|---|
| 572,504 | Dennis | Dec. 1, 1896 |
| 682,926 | Goehring | Sept. 17, 1901 |
| 981,391 | Depew | Jan. 10, 1911 |
| 1,248,324 | Harvin | Nov. 27, 1917 |
| 2,056,900 | Holm | Oct. 6, 1936 |
| 2,071,443 | Weckerly | Feb. 23, 1937 |
| 2,141,296 | Ferguson | Dec. 27, 1938 |
| 2,191,711 | Godat | Feb. 27, 1940 |
| 2,394,476 | Pipping | Feb. 5, 1946 |